United States Patent [19]

Morris et al.

[11] Patent Number: 5,007,721
[45] Date of Patent: Apr. 16, 1991

[54] MECHANICALLY ROTATED DOPPLER FREQUENCY SHIFTER

[75] Inventors: John B. Morris, Billerica; Uve H. W. Lammers, Chelmsford; Richard A. Marr, Billerica, all of Mass.

[73] Assignee: The United States of America as represented by the Secretary of the Air Force, Washington, D.C.

[21] Appl. No.: 529,032

[22] Filed: May 25, 1990

[51] Int. Cl.$^5$ .......................... G02B 5/10; G02B 7/18; G02B 27/00; H01Q 15/16
[52] U.S. Cl. .................................... 350/486; 350/622; 350/624; 350/629; 350/630; 342/6
[58] Field of Search ............... 350/486, 622, 624, 629, 350/630, 6.5, 637; 342/6

[56] References Cited

U.S. PATENT DOCUMENTS

| | | | |
|---|---|---|---|
| 4,264,141 | 4/1981 | Guers et al. | 350/486 |
| 4,370,654 | 1/1983 | Krutsch | 343/18 D |
| 4,418,989 | 12/1983 | McCulla et al. | 350/486 |
| 4,606,031 | 8/1986 | Beene et al. | 372/28 |
| 4,747,664 | 5/1988 | Slaughter | 350/99 |
| 4,830,479 | 5/1989 | Lammers et al. | 350/486 |

OTHER PUBLICATIONS

Vernon, D. "High Sensitivity HCN Laser Interferometer For Plasma Electron Density Measurements", Optics Communications, vol. 10, No. 1, Jan. 1974, pp. 95-98.

Manuccia, T. J., "CW IR Laser Induced Chemistry, Isotope Separation and Related Laser Technology at NRL", Laser in Chemistry, pp. 210-215, Elsevier Scientific Publication Company, dated 1977.

Primary Examiner—Jon W. Henry
Attorney, Agent, or Firm—Irwin D. Garfinkle; Donald J. Singer

[57] ABSTRACT

A mechanical Doppler shifting device for a high frequency radiated beam comprises a rotating helical reflector having its axis of rotation parallel to the beam and a plane stationary mirror mounted parallel to the axis. The helix has a smooth reflective surface which is at a 45 degree slope with respect to the axis so that the distance to the surface from the source of the beam varies with the rotation of the helix. The beam is reflected from the helix to the plane stationary reflector and back upon itself to the source at a Doppler shifted frequency. Also disclosed is a system using 2 helical reflectors, the second being a mirror image of the first and being oppositely rotated synchronously therewith for reflecting the beam to a receiver spaced from the source of the beam.

12 Claims, 3 Drawing Sheets

MECHANICALLY ROTATED DOPPLER FREQUENCY SHIFTER

STATEMENT OF GOVERNMENT INTEREST

The invention described herein may be manufactured and used by or for the Government for governmental purposes without the payment of any royalty thereon.

BACKGROUND OF THE INVENTION

Reflection of a signal from a metallic surface which is in linear motion will produce a constant Doppler shift of the reflected signal. As a practical matter, however, linear motion can only be sustained for limited periods of time. For a continuously Doppler shifted signal, some kind of repetitive process of linear motion must be employed.

Imperfections in presently known mechanical means for frequency shifting make it impossible to generate a single Doppler shifted frequency. Instead, currently known systems generate a spectrum, of frequencies having a frequency spacing which is the reciprocal of the period of the time repetitive process. This spectrum has a maximum amplitude at or near the frequency determined by twice the ratio of the velocity component of the reflector (or reflectors) in the direction of wave propogation and the wavelength. The spectral line of maximum amplitude is surrounded by other spectral lines whose amplitudes depend on the "smoothness" of the repetitive process.

A spectrum of frequencies, rather than a single frequency, is undesirable in certain applications, such as in radar applications, where they may lead to ambiguities. One way to eliminate this problem is to space the nondesirable lines far apart from the desired one. This requires a mechanical process of the highest possible repetition rate. The prior art shows several mechanical systems.

One rotating mechanical frequency shifter is describe an article entitled "High Sensitivity HCN Laser Interferometer For Plasma Electron Density Measurements" by D. Veron, which article appears in Volume 10, Number 1 of *Optics Communications*, dated January 1974. The Veron shifter is, in effect, a large rotating paddle wheel. Each paddle reflects the signal over a small angle of rotation, where its motion can be considered as being linear. Then it is replaced by the next paddle. Although high Doppler offsets may be achieved with high tangential speed of the paddle, many paddles are required to satisfy the linear motion approximation. Consequently, the wheel will have a large diameter and a slow rate of rotation thus producing lines closely spaced in the frequency spectrum.

Another mechanical Doppler frequency shifting scheme is disclosed in an article entitled "CW IR Laser Induced Chemistry, Isotope Separation and Related Laser Technology at NRL" by T. J. Manuccia, which article appears in *Laser in Chemistry*, pages 210-215, Elsevier Scientific Publication Company, dated 1977. Manuccia's shifter is based upon multiple reflections between a stationary involute spiral cylinder and a multiplicity of mirrors attached to a concentrically rotating cylinder. The transmissive scheme as described by Manuccia, where radiation enters in an axial direction at one end of the cylinder and leaves at the other end of the cylinder, neglects the axial spreading between reflection points as reflections occur at increasing radial distances on the involute cylinder. In addition, it does not provide means to make the Doppler shifted signal phase coherent between cylinder revolutions and hence an undesirable spectral spreading will occur.

U.S. Pat. No. 4,264,141 issued to Karl Guers et al on April 28, 1981, discloses an arrangement of apparatus for frequency shifting a monochromatic narrow bandwidth light beam. Guers et al suggested a device comprised of two or more pairs of stationary and rotating reflectors. Although this device has some desirable features, there is no indication of how to avoid phase discontinuities, and this will result in undesirable spectral broadening.

In Lammers et al U. S. Pat. No. 4,830,479 there is disclosed a rotating Doppler frequency shifter similar to Manuccia's device but with several design improvements. Lammers et al discloses a set of two rotating plane reflectors which direct the source signal to a segmented stationary reflector contoured as the involute of a circle. The segmented reflectors produce a phase continuous signal and are smaller than previous designs due to segmentation. Nevertheless, the Lammers et al device is physically more complicated than is the present invention.

Other background patents of interest are U.S. Pat. Nos. 4,370,141 issued to Krutsch, 4,418,989 issued to McCulla et al, 4,606,031 issued to Beene et al and 4,747,664 issued to Slaughter. In Krutsch, the frequency shifter comprises a self-directive reflective device in the form of a plurality of trihedral corner reflectors. McCulla et al disclose a device for shifting the wavelength of light by reflecting the beam back and forth between a rotating body having a retroreflection corner at opposite ends and a fixed mirror to produce the Doppler shift. Beene at al shows a piezoelectric transducer attached to a laser cavity mirror for fast frequency modulating the output of a laser. Slaughter shows helical vanes which are rotated to provide a reflective marker. None of these patents, or any other of the prior art known to the applicants, suggests the helical frequency changer which is the subject matter of the present invention.

SUMMARY OF THE INVENTION

In accordance with the present invention, a rotating Doppler frequency shifter device comprises a rotating helical reflector and a plane stationary reflector mounted parallel to the axis of rotation of the helical reflector. The stationary reflector is positioned so as to reflect a signal impinging thereon from the helix back upon itself. The height of the helix is an integral number of half wavelengths. As the helical surface rotates the reflected beam path is lengthened (or shortened) by an integral number of wavelengths. Once per rotation, the beam steps up (or down) the height of the helix. This arrangement provides for continuous Doppler frequency shifting of the input signal and an output signal of the narrowest spectral width for a given input frequency.

The region between millimeter and infrared wavelengths holds great promise for many spaceborne or laboratory applications because of the extreme bandwidths available. This invention will provide a simple, convenient, low cost component in this frequency range necessary for achieving highly coherent, sensitive heterodyne reception with a single source of moderate coherence. Examples for the use of this invention will be found in the measurement of dielectric properties of materials, atmospheric propagation measurements, high resolution Doppler imaging of scaled radar targets, and many more.

This invention provides a mechanically rotated single turn helical reflector of 45 degree slope in combination with a stationary plane reflector positioned parallel to the axis of rotation of the helix. The radiated signal from a source arriving parallel with this axis reflects from the helix to the plane reflector and back upon itself. Since the distance from the source to the helix varies as the helix is rotated, there will be a shift in the frequency of the reflected beam of radiation. At millimeter, submillimeter, and infrared wavelengths signal sources are often fixed in frequency. Frequency shifting achieved by modulation with another frequency in a non-linear device is generally of low efficiency at these frequencies. This invention is capable of frequency shifting an incident signal efficiently and coherently by mechanical means.

OBJECTS OF THE INVENTION

It is therefore an object of the present invention to provide a rotating Doppler frequency shifter device of improved construction and performance.

It is another object of the present invention to provide a rotating Doppler frequency shifter device especially adapted for use in the submillimeter wavelength range.

It is a further object of the present invention to provide a rotating Doppler frequency shifter device which is efficient in providing high output power levels in its frequency range of operation.

It is a further object of the present invention to provide a rotating Doppler frequency shifter device which is mechanically tunable to achieve an output signal of the narrowest spectral width for a given input frequency.

BRIEF DESCRIPTION OF THE DRAWINGS

The foregoing and other objects, features and advantages of the present invention will become more apparent upon reading the following detailed description thereof in conjunction with the drawings, in which.

DETAILED DESCRIPTION OF THE PREFERRED EMBODIMENTS

Figure 1A:
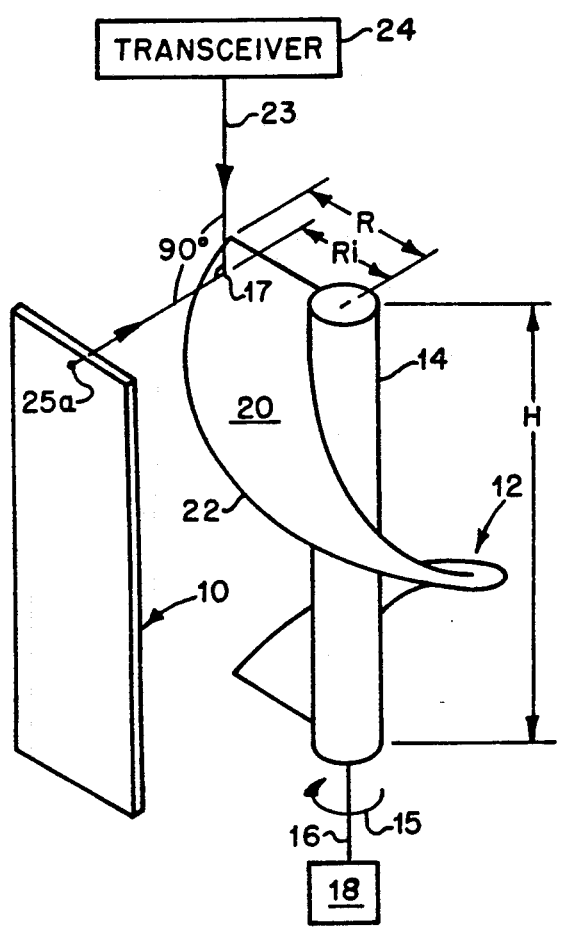
FIG. 1a is a side view showing a perspective view of one
Figure 1B:
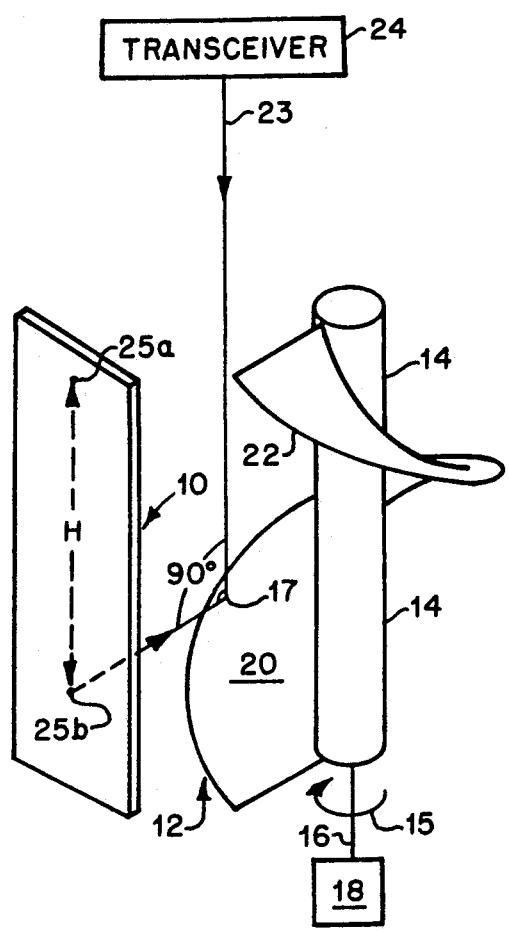
FIG. 1b is a view similar to FIG. 1a, but rotated approximately 270 degrees.
Figure 2:
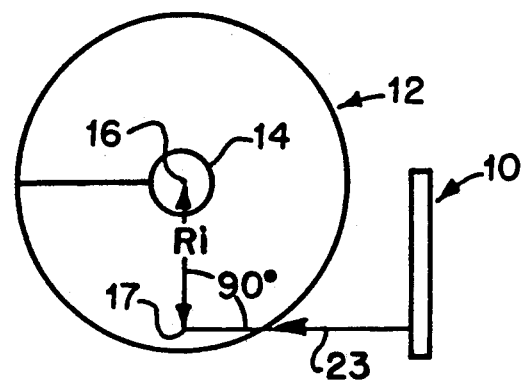
FIG. 2 is a plan view of the embodiment illustration in FIG. 1.
Figure 3:
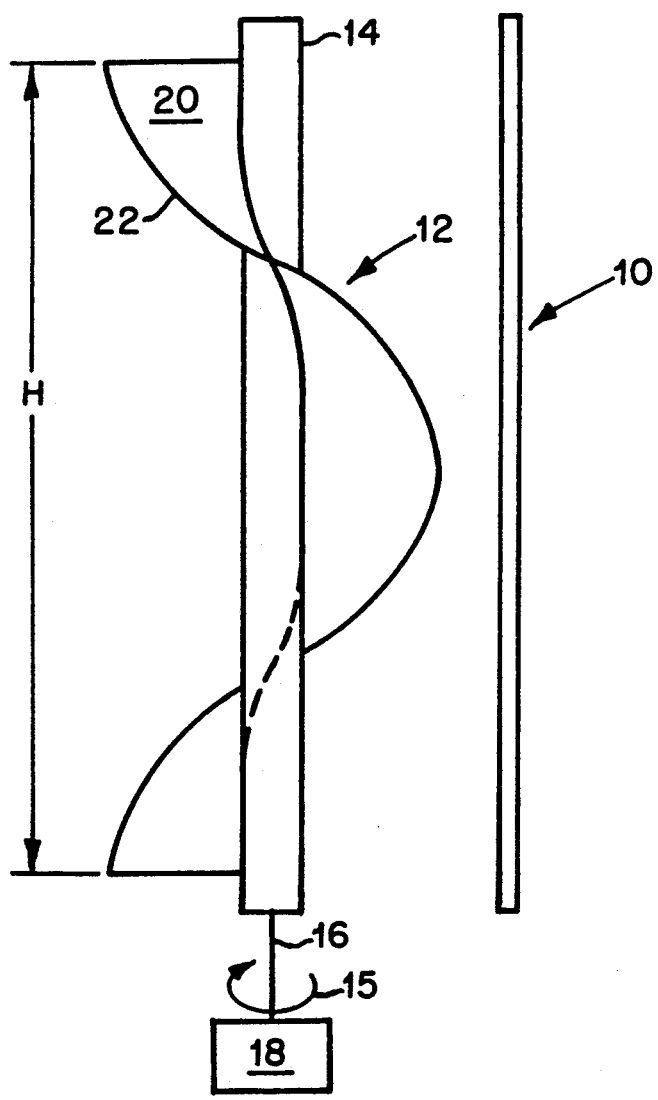
FIG. 3 is a side view of the embodiment illustrated in FIG. 1.

As seen in FIGS. 1 to 3, the mechanically rotated frequency shifter consists of two reflective components. One is a plane stationary reflector 10, and the other is a rotating helical reflector 12 mounted from the surface of a cylinder 14. The reflector 12 is rotated in the direction of the arrow 15 on the cylinder axis 16 by means of an electric motor 18. The helical reflector 12 has a smooth, continuous surface 20 which may be visualized as an infinite number of lines drawn from every point on the outer edge 22 of the helix to the cylinder 14, the extension of such lines being perpendicular to and passing through the axis 16.

The radius Ri (the radius from the point of incidence 17 of a transmitted beam) and the height H of the helix are chosen such that the slope of the helix at such point is at an angle of 45 degrees relative to the axis 16 and to the plane of the stationary reflector 10. It should be noted, however, that the overall radius R of the helix is slightly larger than the Radius Ri; this arrangement allows a beam of finite diameter to be reflected at an angle of 90 degrees from the helical surface. A narrow beam 23 of energy radiated from a transceiver 24 along a line parallel to the axis 16 striking the helical surface 20 centered at the point of incidence 17 will be reflected 90 degrees toward the stationary plane reflector 10. The beam 23, after striking the plane reflector 10 at point 25a, is returned along the same path on which it arrived. To establish the 45 degree angle, the height H of the helix must be equal to $2(\mathrm{Pi})(\mathrm{Ri})$.

FIG. 1b illustrates the same helical reflector 12 rotated approximately 270 degrees and shows how the path length that the beam 23 travels is increased by the movement of the point of incidence 17 linearly down the helix as the helix rotates in the direction of the arrow 15. The path length between the surface 20 and the plane reflector 10 remains constant, but the distance from the first point of incidence 25a on the reflector 10 to the point 25b (see FIG. 1b) indicates the increase in path length for the amount of rotation illustrated (approximately 270 degrees). At 360 degrees, that distance is equal to the height H of the helix.

After a complete revolution of the helix the beam encounters a displacement discontinuity. That is, the reflection point at the helix changes abruptly from the bottom of the surface 20 to the top, causing the beam path length to change by an amount equal to the height of the helix. In order to maintain phase continuity, $2H/L$ must be an integer value, where L is the wavelength. The relative motion between the source and reflector gives rise to a Doppler frequency shift of $F = 2HW/L$ hertz, where W is the rotation rate in revolutions per second. To make the device usable over a contiguous range of wavelengths, the stationary reflector may be tilted slightly toward the helix on one end so as to achieve an integral number of wavelengths shift per revolution. The tilt must be small enough for the beam to return essentially along its path of arrival.

Figure 4:
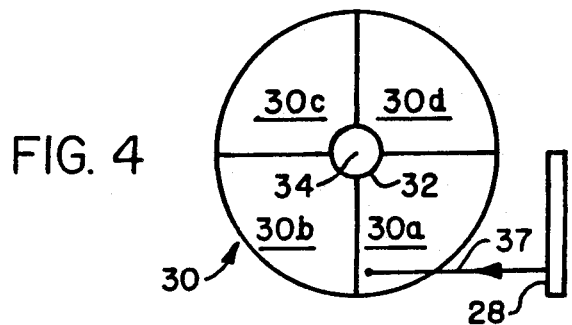
FIG. 4 is a plan view of a second preferred embodiment of this invention using 4 identical quarter turn segments.
Figure 5:
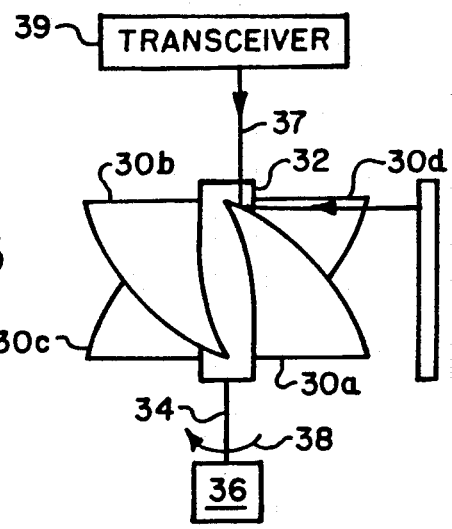
FIG. 5 is a side elevation of the second preferred embodiment.

To minimize beam profile distortion, the beam diameter on the rotating helical reflector must be kept small so that the local helical surface may be considered plane. This is accomplished by reducing the path length the beam must travel in the device. A second embodiment of the invention is illustrated in FIGS. 4 and 5 which show a four segment helical reflector that produces the same Doppler shift as the unitary device illustrated in FIGS. 1-3, but in which the change in the length of travel of the beam from the transceiver is reduced.

In this second embodiment, the mechanically rotated frequency shifter also consists of two reflective components. One is a plane stationary reflector 28 and the other is a mechanically rotated helical reflector 30 having four reflective segments 30a-30d. The four segments 30a-30d of the helical reflector are mounted at the same height on cylinder 32, which has an axis of rotation 34, and is rotated by an electric motor 36.

The four segments 30a–30d, if assembled vertically on the cylinder 32, would be in the same form as the embodiment of FIGS. 1–3. Instead, the four identical segments are mounted at the same height, but are spaced 90 degrees apart. This results in four one quarter turn identical helixes. When a narrow beam from the transceiver impinges on the rotating segments the beam travels down the surface of each segment. After it reaches the bottom of one segment, it starts at the top of the next. With this arrangement, there are four discontinuities for each revolution of the reflector 30.

Each segment of the fan-like device is an identical quarter turn of the helix. The structure rotates at the same rate as the previous embodiment. The overall height of the four segment device is equal to H/4, where H is the height of a one turn unitary helix as used in the first embodiment. To insure phase continuous frequency shifting, H/2L must be an integer.

While the embodiment of FIGS. 4 and 5 is divided into four segments, it will be understood that it may be subdivided into any integer number N of segments so long as the individual height is made an integral number of half wavelengths, that is, as long as 2H/NL remains an integer.

Figure 6:
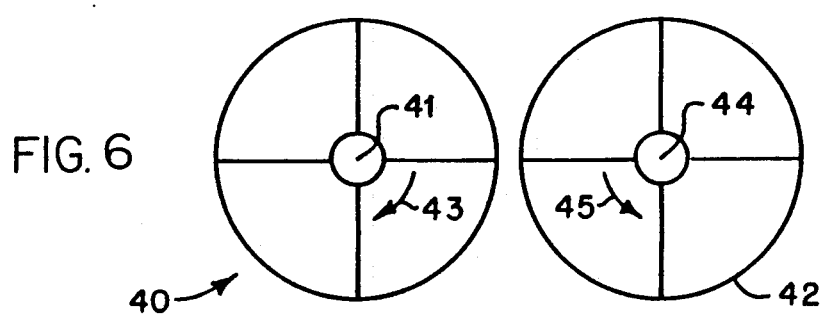
FIGS. 6 and 7 are views showing still another embodiment of this invention.
Figure 7:
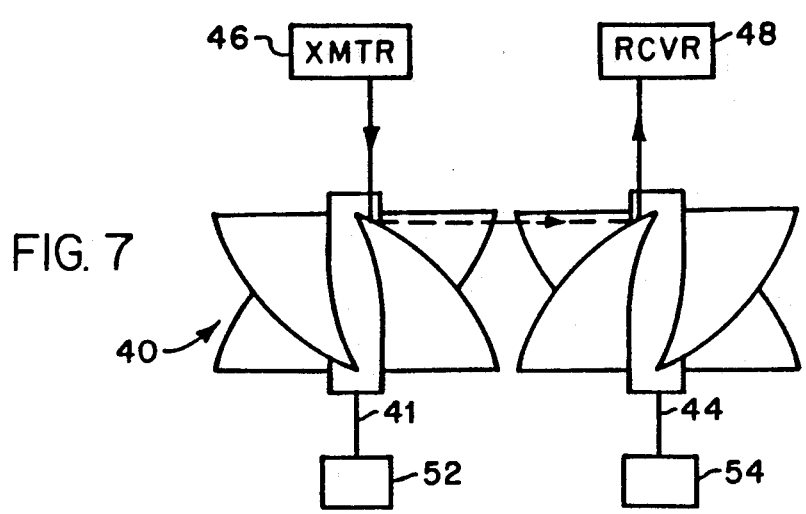

While the embodiments so far described operate in the reflection mode, that is, the output of each device is colinear with the input, the third embodiment of this invention illustrated in FIGS. 6 and 7 operates in the transmission mode by using two counter-rotating, helical reflectors 40 and 42, but with the helixes wound in opposite directions, and spaced apart on parallel axes 41 and 44, respectively. The reflector 40 is driven by motor 52 in the direction of the arrow 43, while the reflector 42 is driven by motor 54 in the opposite direction as indicated by the arrow 45. (The plane reflector is not used.) The reflector 40 in FIG. 6 is identical to the reflector 30 in FIGS. 4 and 5. The second helical reflector 42 is, in essence, a mirror image of the first helical reflector. Since the output of the two spiral reflectors is not colinear, that is, the transmitted beam is spaced from the reflected beam, this transmission mode facilitates the separation of the Doppler shifted signal from the source signal, and therefore, FIG. 7 shows a separate transmitter 46 and a separate receiver 48.

The major advantage of the mechanically rotated frequency shifter is its simplicity and compactness. It consists of only two principal parts in the reflective configuration and can be made of narrow radial extent by placing the stationary reflector as close to the rotating one as its freedom of rotation will permit. In the axial dimension, segmentation allows one to further shrink the overall size of the device. Provisions for phase continuous frequency shifting can be made through an appropriate design.

Having thus described several exemplary embodiments of this invention, various modifications and adaptations will become apparent to persons skilled in the art without departing from the spirit or scope of the invention. It is intended, therefore, that this invention be limited only by the appended claims as interpreted in the light of the prior art.

What is claimed is:

1. A Doppler frequency shifter for a transmitted high frequency narrow beam, the combination comprising:

a transmitter for radiating said narrow beam, and a receiver for receiving Doppler shifted reflections of said beam;

a cylinder mounted for rotation on its axis, said axis being parallel to said beam;

a first reflector comprising a helix having a smooth reflecting surface for reflecting said beam, said helix being mounted on said cylinder and said transmitted beam impinging thereon at a radial distance Ri from said axis, the surface of said reflector being defined by an infinite number of lines drawn from every point on the outer edge of said helix to the cylinder, the extension of such lines being perpendicular to and passing through the outer edge of said helix and the axis of said cylinder;

means for rotating said reflector on said axis, whereby said beam impinges on said surface along different heights of said helix and the length of travel of said beam to said helix varies as said helix is rotated; and a second reflector for intercepting reflected beam from said first reflector, and for reflecting said intercepted beam toward said receiver.

2. The invention as defined in claim 1 wherein helix is a single turn having a 45 degree slope with respect to said axis at the point of incidence of said beam.

3. The invention as defined in claim 1 wherein said helix is a single turn and; the reflection point on the helix is at radius Ri, and the height of the single turn is 2Pi times Ri, whereby the slope of the helix is 45 degrees.

4. The invention as defined in claim 3 wherein said second reflector is a plane stationary reflector, the surface of which is parallel to the axis of said cylinder, and wherein said beam is reflected back on itself to said first reflector and from said first reflector toward said receiver.

5. The invention as defined in claim 4 comprising N-1 additional reflectors, N being an integer greater than one, all of said reflectors being defined as said first reflector as set out in claim 1 from a single 360 degree turn helix divided into N segments, each of said segments being mounted at the same height on said cylinder at spacing of 360/N degrees.

6. The invention as defined in claim 5 wherein 2H/NL is set to an integer value to achieve an output signal of the narrowest spectral width for a single given input frequency, where H is the height of the helix, and L is the wavelength.

7. The invention as defined in claim 1 wherein said second reflector is a mirror image of said first reflector and is rotated synchronously in a direction opposite to said first reflector, and wherein said receiver is displaced from said transmitter a distance equal to the distance between the reflection points on said first and second reflectors.

8. A Doppler frequency shifter for a transmitted high frequency narrow beam, the combination comprising' a transceiver for radiating said narrow beam, and for receiving Doppler shifted reflections of said beam;

a first reflector comprising a helix having a smooth reflecting surface for reflecting said beam, the axis of said helix being parallel to said transmitted beam, the surface of said reflector being defined by an infinite number of lines drawn from every point on the outer diameter of said helix through said axis and perpendicular thereto, said beam being directed toward said surface adjacent said outer diameter;

means for rotating said reflector on said axis so that said beam impinges on said surface along different heights of said helix, whereby the length of travel of said beam to said helix varies as said helix is rotated; and a second reflector for intercepting reflected beams from said first reflector and reflecting said beams toward said receiver.

9. The invention as defined in claim 8 wherein said helix is a single turn and the reflection point on the helix is at radius Ri, and the height of the single turn is 2Pi times Ri, whereby the slope of the helix is 45 degrees.

10. The invention as defined in claim 8 wherein said second reflector is a plane stationary reflector, the surface of which is parallel to said axis, and wherein said beam is reflected back on itself to said first reflector and from said reflector toward said receiver.

11. The invention as defined in claim 8 comprising N-1 additional reflectors, N being an integer greater than one, all of said reflectors being defined as said first reflector as set out in claim 8 from a single 360 degree turn helix consisting of N segments, each of said segments being mounted at the same height on said cylinder at spacings of 360/N degrees, and wherein 2/NL is set to an integer to achieve an output signal of the narrowest possible spectral width, where H is the height of the helix, and L is the wavelength.

12. The invention as defined in claim 8 wherein said second reflector is a mirror image of said first reflector and is rotated synchronously in a direction opposite to said first reflector, and wherein said receiver is displaced from said transmitter a distance equal to the distance between the reflection points on said first and second reflectors.

* * * * *